United States Patent
Foskey et al.

(10) Patent No.: US 9,169,010 B2
(45) Date of Patent: Oct. 27, 2015

(54) OFFSET STACKED YOKE HUB FOR TILTROTOR AIRCRAFT

(75) Inventors: Christopher Foskey, Grand Prairie, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 917 days.

(21) Appl. No.: 13/405,030

(22) Filed: Feb. 24, 2012

(65) Prior Publication Data

US 2013/0224025 A1    Aug. 29, 2013

(51) Int. Cl.
| | |
|---|---|
| B64C 27/48 | (2006.01) |
| B64C 27/52 | (2006.01) |
| B64C 27/33 | (2006.01) |
| B64C 27/35 | (2006.01) |

(52) U.S. Cl.
CPC ............... *B64C 27/33* (2013.01); *B64C 27/35* (2013.01)

(58) Field of Classification Search
CPC ........ B64C 27/33; B64C 27/35; B64C 27/39; B64C 27/41; B64C 27/52; B64C 27/48
USPC ..................... 416/102, 134 A, 148
See application file for complete search history.

(56) References Cited

U.S. PATENT DOCUMENTS

| | | | |
|---|---|---|---|
| 2,457,429 A | 12/1948 | Young | |
| 3,625,631 A | 12/1971 | Covington, Jr. et al. | |
| 4,898,515 A | 2/1990 | Bene et al. | |
| 5,211,538 A | 5/1993 | Seghal et al. | |
| 7,275,913 B2 | 10/2007 | Becker et al. | |
| 8,147,198 B2 | 4/2012 | Baskin | |
| 8,640,983 B2 * | 2/2014 | Brunken, Jr. | ...... 244/6 |
| 8,985,951 B2 * | 3/2015 | Rauber et al. | ...... 416/141 |

(Continued)

FOREIGN PATENT DOCUMENTS

| | | |
|---|---|---|
| CA | 2122124 A1 | 6/1993 |
| CA | 2762219 A1 | 11/2010 |

OTHER PUBLICATIONS

Office Action for related Canadian Patent Application No. 2,806,277, dated Jul. 9, 2014, 2 pages, Canadian Intellectual Property Office.

(Continued)

*Primary Examiner* — Craig Kim
*Assistant Examiner* — Jason Davis
(74) *Attorney, Agent, or Firm* — Klemchuk LLP; Kirby B. Drake

(57) ABSTRACT

A tiltrotor rotor hub comprises first and second configurations of yokes arranged in two parallel and axially offset planes, each having an equal number of two or more yokes substantially equally spaced about a mast, wherein a portion of each yoke overlaps with a portion of each azimuthally adjacent yoke. Another tiltrotor rotor hub is selectively positionable for operation in helicopter/airplane/transition modes and comprises substantially parallel and axially offset first and second planes, each containing a plurality of blade yokes arranged about a central axis and a portion of each yoke overlaps with a portion of each azimuthally adjacent yoke. Another tiltrotor rotor hub is coupled to a tiltrotor mast and comprises a stacked arrangement of blade yokes wherein a portion of each yoke overlaps with a portion of each azimuthally adjacent yoke, and a plurality of mounting components coupling each yoke to the overlapping azimuthally adjacent yoke.

20 Claims, 11 Drawing Sheets

(56) References Cited

U.S. PATENT DOCUMENTS

2008/0101934 A1\* 5/2008 Stamps et al. ............ 416/134 A
2010/0221119 A1 9/2010 Baskin
2012/0061526 A1\* 3/2012 Brunken, Jr. .................. 244/7 C

OTHER PUBLICATIONS

European Search Report for related EP Application No. 12161901.9, Nov. 20, 2012, 7 pages, European Patent Office.

\* cited by examiner

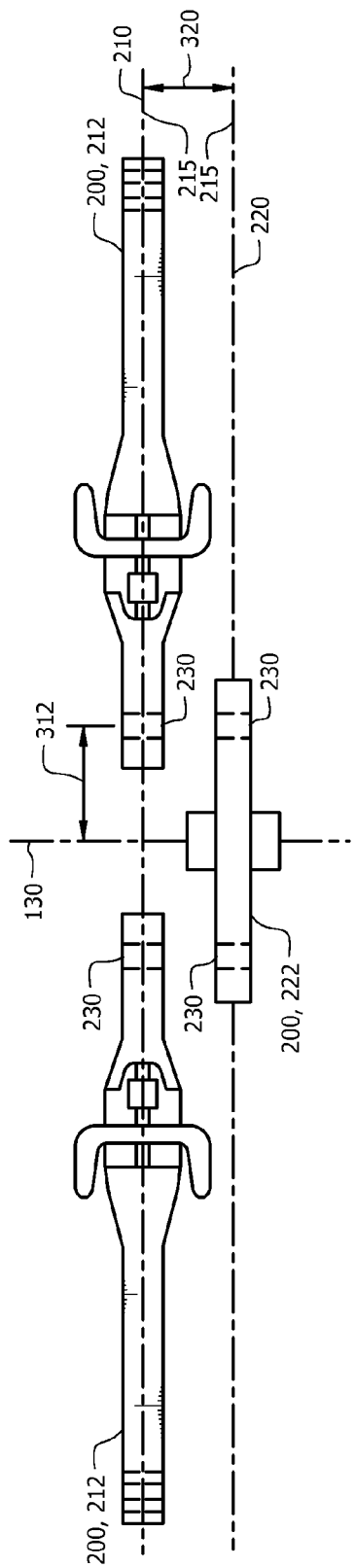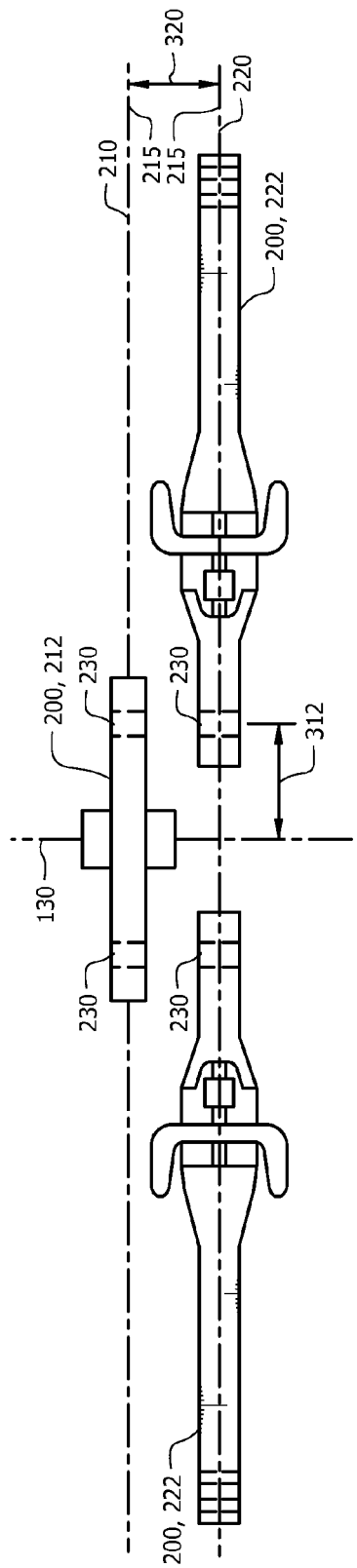
FIG. 4B
FIG. 4C

OFFSET STACKED YOKE HUB FOR TILTROTOR AIRCRAFT

FIELD OF THE DISCLOSURE

The present disclosure generally relates to a rotor hub, and more particularly, to a tiltrotor aircraft rotor hub having yokes in two or more axially offset planes.

BACKGROUND

Rotor hubs are used to mount the rotor blades of tiltrotor aircraft in predetermined geometric configurations, and also serve to oppose centrifugal forces acting to pull the spinning blades away from a centerline of rotation. Generally, hubs having a radially compact arrangement about the centerline of rotation experience lower relative loads, as the moment arm between system forces and the center of rotation is reduced. Lower loads allow components and other structure to be leaner, resulting in reduced system weight. Additionally, compact hub designs may have lower drag coefficients due to having smaller profiles. However, the extent of compact radial packaging may be limited by physical interferences between components, especially in systems having multiple spinning elements. In such systems, hub components may be arranged at a radius from the centerline of rotation sufficient to provide circumferential space to physically accommodate each spinning element and its given range of motion in a given plane, thereby limiting the compactness of the design.

In addition, rotor blade diameter on tiltrotor aircraft often results from a design compromise between desired vehicle performance in "helicopter mode" (primarily vertical takeoff/landing, hover, and low speed flight) and "airplane mode" (primarily high speed forward flight). Generally speaking, larger diameter rotors offer favorable performance in helicopter mode, but may degrade performance in airplane mode, and vice versa. Improvements in rotor efficiency in helicopter mode may provide for a smaller diameter rotor to be used, thereby potentially improving performance in airplane mode, resulting in overall improved vehicle performance.

SUMMARY

Embodiments of the present disclosure generally provide rotor hubs for tiltrotor aircraft.

The present disclosure is directed to a rotor hub of a tiltrotor aircraft comprising a first configuration of two or more yokes arranged in a first plane about a mast of the tiltrotor aircraft and having substantially equal angular spacing therebetween, and a second configuration of an equal number of yokes as the first configuration, the equal number of yokes being arranged in a second plane about the mast of the tiltrotor aircraft and having substantially equal angular spacing therebetween, wherein the second plane is substantially parallel to and axially offset from the first plane, and wherein a portion of each yoke in the first configuration overlaps with a portion of each azimuthally adjacent yoke in the second configuration.

In various embodiments, the second configuration yokes are angularly offset from the first configuration yokes. In an embodiment, the second configuration yokes substantially bisect the angular spaces separating the first configuration yokes.

In an embodiment, at least some of the yokes of the first configuration and second configuration may undergo flapping motion. In another embodiment, the second plane is axially offset from the first plane by a predetermined distance sufficient to accommodate flapping without interference. In yet another embodiment, the second plane is axially offset from the first plane by a predetermined distance substantially equal to about one or two rotor chord lengths.

In an embodiment, the hub further comprises a common mounting component coupling each first configuration yoke to at least one azimuthally adjacent second configuration yoke. In an embodiment, at least some of the yokes of the first configuration and the second configuration are substantially stiff in-plane. In yet another embodiment, the first configuration yokes and the second configuration yokes are arranged at a common radius from the mast.

In an embodiment, the first configuration has two yokes and the second configuration has two yokes. In another embodiment, the first configuration has three yokes and the second configuration has three yokes. In yet another embodiment, the first configuration has four yokes and the second configuration has four yokes.

In another aspect, the present disclosure is directed to a rotor hub of a tiltrotor aircraft comprising a plurality of blade yokes arranged in a first plane about a central axis, and a plurality of blade yokes arranged in a second plane about the central axis, wherein the second plane is substantially parallel to and axially offset from the first plane, a portion of each yoke in the first plane overlaps with a portion of each azimuthally adjacent yoke in the second plane, and the rotor hub is selectively positionable for operation of the tiltrotor aircraft in helicopter mode, airplane mode, and transition modes therebetween. In various embodiments, the plurality of blade yokes in each of the first plane and second plane are positioned with substantially equal angular spacing therebetween. In various embodiments, the plurality of blade yokes in the first plane are angularly offset from the plurality of blade yokes in the second plane. In an embodiment, the plurality of blade yokes in the second plane substantially bisect the angular spaces separating the plurality of blade yokes in the first plane.

In an embodiment, the hub further comprises a common mounting component coupling each yoke in the first plane to the overlapping azimuthally adjacent yoke in the second plane.

In another aspect, the present disclosure is direct to a rotor hub of a tiltrotor aircraft comprising a plurality of blade yokes configured in a stacked arrangement such that a portion of each yoke in a first axial plane overlaps with a portion of each azimuthally adjacent yoke in a second axial plane, and a plurality of mounting components, each mounting component coupling each yoke in the first axial plane to the overlapping azimuthally adjacent yoke in the second axial plane, wherein the rotor hub is coupled to a mast of the tiltrotor aircraft. In various embodiments, the plurality of blade yokes in each of the first plane and the second plane are positioned with substantially equal angular spacing therebetween. In an embodiment, the plurality of blade yokes in the second plane substantially bisect the angular spaces separating the plurality of blade yokes in the first plane.

BRIEF DESCRIPTION OF THE DRAWINGS

For a more complete understanding of this disclosure, reference is now made to the following description, taken in conjunction with the accompanying drawings, in which:

FIG. 4B depicts a side cutaway view of the arrangement of yokes in an offset stacked yoke hub of FIG. 4A according to an embodiment of the present disclosure;

FIG. 4C depicts a side cutaway view of the arrangement of yokes in an offset stacked yoke hub of FIG. 4A, shifted 90° about a vertical axis with respect to the side cutaway view of FIG. 4B, according to an embodiment of the present disclosure;

DETAILED DESCRIPTION

Embodiments of the present disclosure generally provide an offset stacked yoke rotor hub for use on a tiltrotor aircraft. As described herein, the rotor hub may package tightly to a rotorcraft mast, thereby reducing weight, drag profile, and loads on the hub and accompanying structure. The rotor hub may also provide for improved aerodynamic rotor performance in axial flow compared to single-plane rotor hubs, resulting in possible production of a comparable thrust/power ratio using a smaller diameter rotor disk. In various embodiments, blade yokes may be arranged in two or more axially offset planes, may partially overlap, and may share common axial retainer bolts.

FIGS. 1-8B illustrate representative embodiments of offset stacked yoke hubs 100, 500, 600 and parts thereof. It should be understood that the components of offset stacked yoke hubs 100, 500, 600 and parts thereof shown in FIGS. 1-8B are for illustrative purposes only, and that any other suitable components or subcomponents may be used in conjunction with or in lieu of the components comprising offset stacked yoke hubs 100, 500, 600 and the parts of offset stacked yoke hubs 100, 500, 600 described herein.

Offset stacked yoke hubs 100, 500, 600 according to the present disclosure may be used to secure rotor blades on tiltrotor aircraft. Hubs 100, 500, 600 may support blades or other items attached thereto in a predetermined geometric arrangement and may oppose centrifugal forces acting on those items during rotation of the system. Hubs 100, 500, 600 may be configured to provide for yoke flapping and pitching motion. The present disclosure is directed to various embodiments of offset stacked yoke hubs 100, 500, 600 that closely package multiple yokes 200 about a central axis 130, and may thereby reduce weight, drag profile, and loads on the hubs 100, 500, 600 and accompanying structure.

Figure 1:
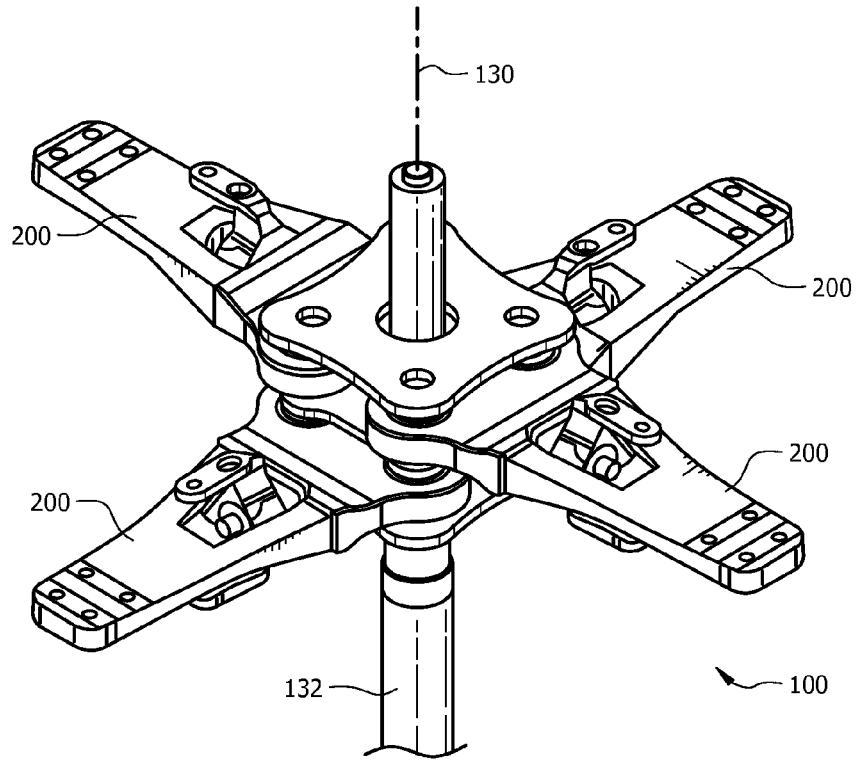
FIG. 1 depicts a perspective view of an offset stacked yoke hub coupled to a mast according to an embodiment of the present disclosure.

Referring now to FIG. 1, an offset stacked yoke hub 100 is depicted coupled to a tiltrotor mast 132. The offset stacked yoke hub 100 may generally comprise a plurality of blade yokes 200, such as an even number of blade yokes 200, arranged about a central axis 130 in a predetermined geometric configuration. As described in more detail herein, yokes 200 may be axially offset from one another along the central axis 130, and yokes 200 may substantially overlap one another (thereby being "stacked") so as to package tightly with respect to central axis 130. Offset stacked yoke hub 100 may be coupled to a tiltrotor mast 132 as further described herein and may rotate about central axis 130. Rotation of hub 100 may be driven by the tiltrotor mast 132 or by other external forces acting on hub 100 or the blades attached thereto.

Figure 2:
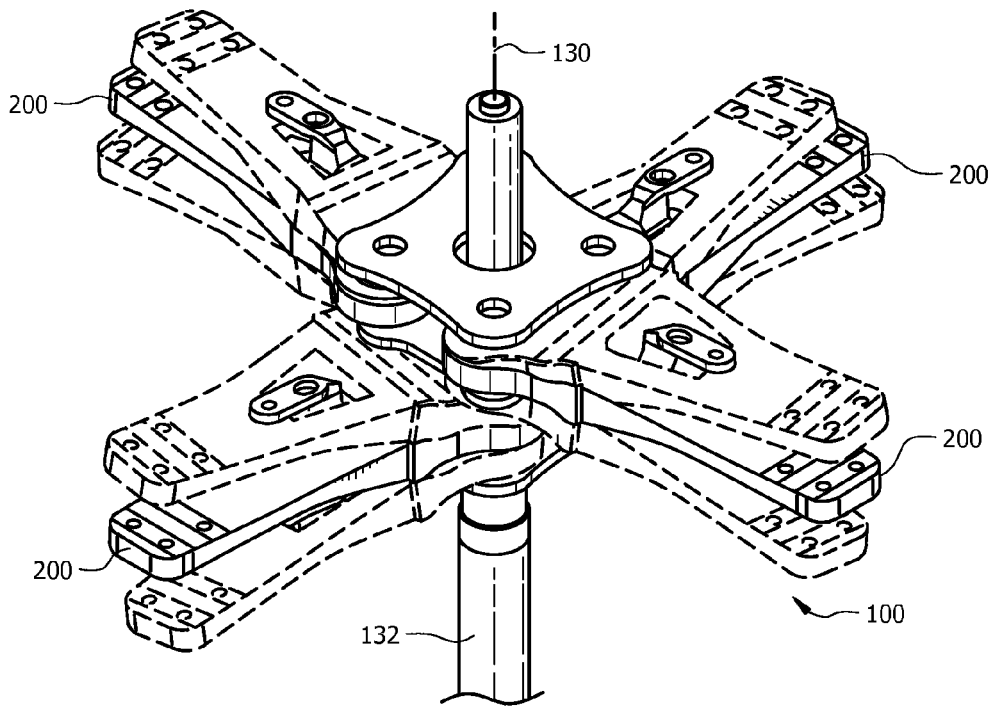
FIG. 2 depicts a perspective view of the offset stacked yoke hub of FIG. 1, schematically representing four yokes undergoing flapping motion according to an embodiment of the present disclosure.

In various embodiments, construction of hub 100 may provide for motion of blade yokes 200, as the flapping motion schematically depicted FIG. 2.

Yokes

Figure 3A:
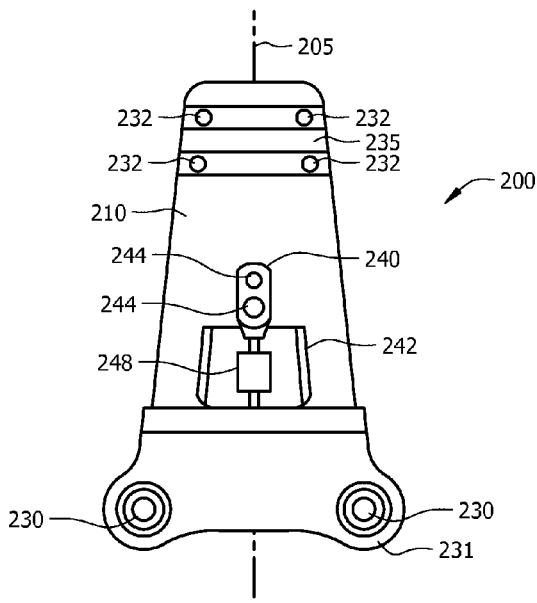
FIG. 3A depicts a top view of a yoke of an offset stacked yoke hub according to an embodiment of the present disclosure.
Figure 3B:
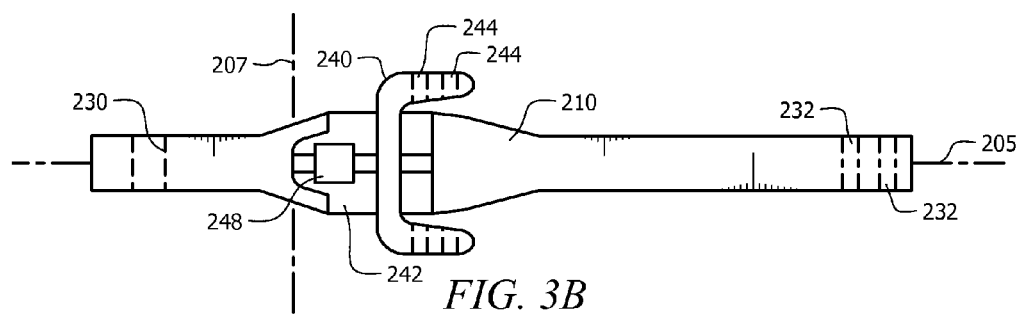
FIG. 3B depicts a side cutaway view of a yoke according to an embodiment of the present disclosure.
Figure 3C:
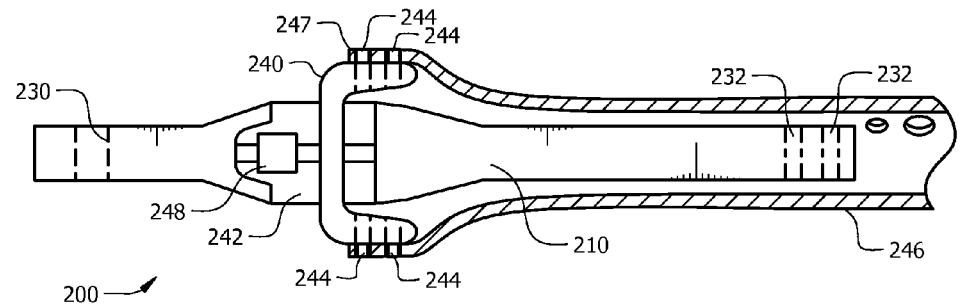
FIG. 3C depicts another side cutaway view of the yoke of FIG. 3B with a blade cuff coupled thereto according to the embodiment of the present disclosure.

As depicted in FIG. 1, offset stacked yoke hub 100 may comprise four or more substantially identical yokes 200. FIGS. 3A and 3B depict a top view and a side cutaway view, respectively, of a representative yoke 200 having a longitudinal axis 205 and a lateral axis 207, and FIG. 3C depicts a side cutaway view of the yoke 200 with a blade cuff 246 coupled thereto. The yoke 200 comprises a yoke body 210 extending longitudinally from an inner end 231 to an outer end 235 and having a substantially elongated planform (for example, rectangular, ovular, triangular, or a variant thereof). The yoke body 210 may be constructed of any suitable material able to withstand the forces and moments of the dynamic system including, but not limited to, laminated fiberglass composites, carbon composites, or any combination thereof. Yokes 200 of hubs 100, 500, and 600 may be limited to stiff in-plane constructions in order to handle loads associated with strong axial flow in tiltrotor airplane mode. One or more retainer holes 230 may be laterally disposed through the inner end 231.

Each yoke 200 may further comprise an inboard beam assembly 240. In an embodiment, the inboard beam assembly 240 comprises a substantially "C" shaped member constructed of forged metallic material. The inboard beam assembly 240 may be disposed within a cutout 242 in the yoke 200 and may be oriented such that the open part of the "C" faces radially outward with respect to central axis 130. Inboard beam assembly 240 may be rotationally coupled to yoke 200 about longitudinal axis 205, providing for possible pitching motion of components coupled thereto. In an embodiment, a blade (or intermediate structure, such as a composite blade grip 246) may be coupled to inboard beam assembly 240 via inboard beam attachment holes 244 using any suitable mechanism, such as one or more bolts.

Each yoke 200 may further comprise coupling means by which a blade (or intermediate structure) may couple thereto and be restrained against centrifugal forces acting to pull the blade away from a centerline of rotation during rotation. In one embodiment, a blade (or intermediate structure, such as a spindle assembly, not shown) may be coupled to yoke 200 via yoke attachment holes 232 using any suitable mechanism, such as one or more bolts.

Arrangement of Yokes in Yoke Planes

Figure 4A:
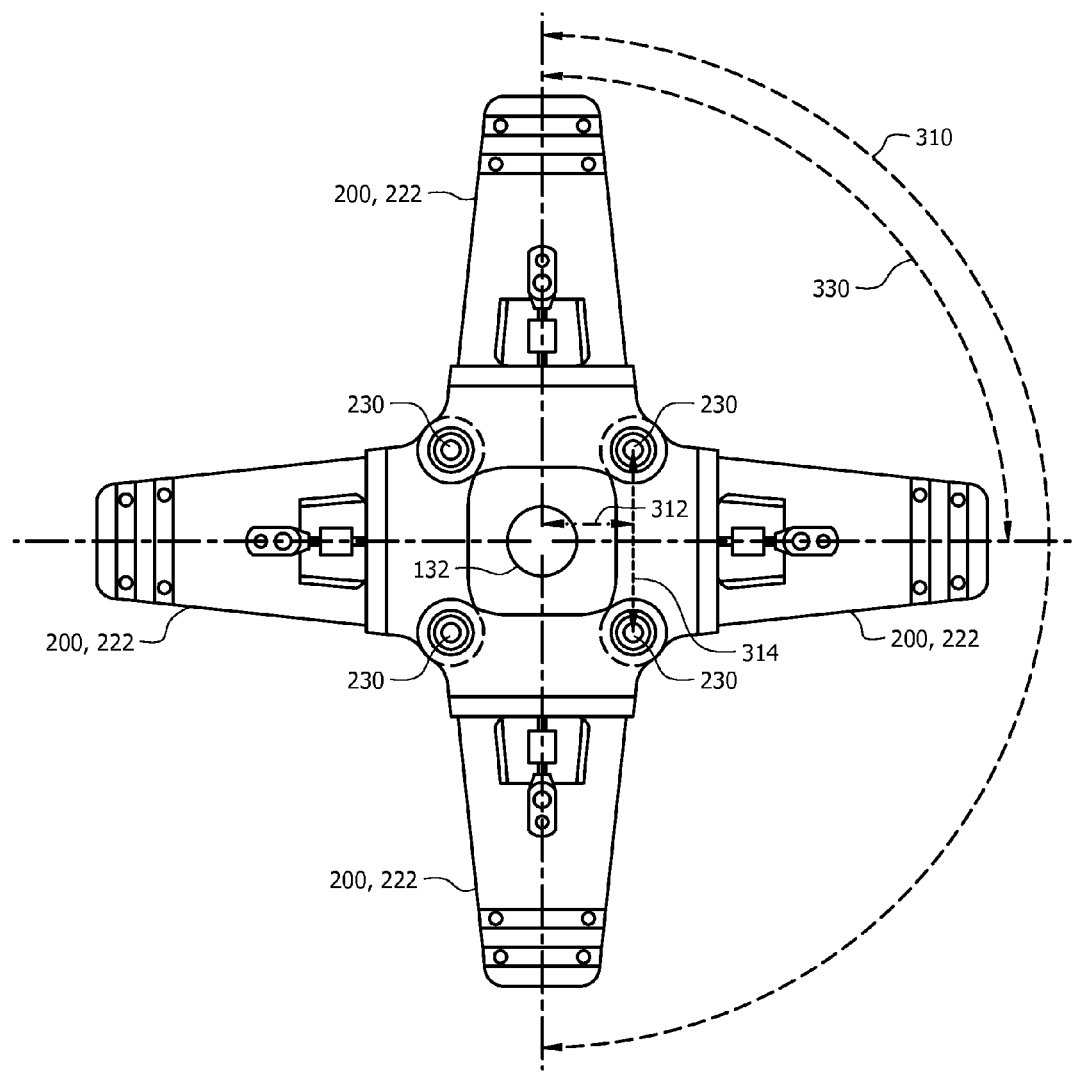
FIG. 4A depicts a top view of an arrangement of yokes in an offset stacked yoke hub according to an embodiment of the present disclosure.

FIG. 4A depicts a top view, and FIGS. 4B and 4C depict side cutaway views offset from one another by 90°, of an arrangement of four yokes 200 of offset stacked yoke hub 100. The yokes 200 may be arranged in two or more planes 215, each containing the same number of yokes 200. In one embodiment, yokes 200 and planes 215 may comprise two groups—those yokes 212 situated in a first plane 210, and those yokes 222 situated in a second plane 220. As best shown in FIG. 4A, yokes 212 are arranged about a central axis 130 (possibly defined by a mast 132) at a radius 312, and are equally spaced at planar spacing angles 310 within plane 210. An equal number of yokes 222 are similarly arranged about the same mast 132 at the same radius 312, and are equally spaced at planar spacing angles 310 in plane 220. Such an arrangement provides for balanced mass distribution within the plane 215 to manage dynamic loads and stability in rotating systems, such as rotors.

Mechanical packaging and load considerations may influence radii 312. Generally speaking, flapping forces are concentrated at a flapping hinge 314, and the radius 312 (also known as hinge offset) between the central axis 130 and the flapping hinge 314 defines a moment arm. Therefore, the closer a flapping hinge 314 is situated to a mast 132, the lower the flapping moment imparted to the mast 132. This may result in reduced weight by allowing the mast 132 and other components to be leaner, and may result in reduced drag by narrowing the profile of the hub 100. In embodiments using substantially rigid, stiff in-plane yokes 200, a flapping hinge 314 may comprise an actual hinge within the yoke body 210 of yoke 200, or the flapping hinge 314 may instead coincide with the mechanical juncture of the yoke 200 to offset stacked yoke hub 100. Radius 312 may, however, be conversely influenced by mechanical packaging considerations, such as establishing a minimum radius 312 to physically assemble hub 100 about a mast 132 without interferences. One having ordinary skill in the art will recognize a desirable radius 312 for a given application.

Axial Arrangement of Yoke Planes

Still referring to FIGS. 4A, 4B, and 4C, each yoke plane 215 may be substantially parallel, and may share a common central axis 130. Each plane 215 may be axially offset from the others at a predetermined axial offset distance 320, as best shown in FIGS. 4B and 4C. Predetermined axial offset distance 320 may be influenced by design considerations including, but not limited to, flapping angle, weight, and performance characteristics. Predetermined axial offset distance 320 may be of sufficient length to avoid physical interference of yokes 200 in the various planes 210, 220 and the blades attached thereto when undergoing flapping motion. While larger offset distances 320 may generally provide ample flapping clearance, they may extend the height of hub 100, which may result in increased weight due to the additional material. Additionally, radial forces acting on a taller hub 100 may result in greater moments thereby driving increased structural weight to handle the loads. Similarly, a taller hub 100 may result in increased drag. However, other aerodynamic performance benefits may drive predetermined offset distance 320 to be greater than that necessary to provide flapping clearance. Offset rotor disks often demonstrate improved aerodynamic efficiency in axial flow conditions. At certain offset distances, the rotor may perform as though it has a larger effective diameter, resulting in increased thrust/power ratio than a similar single-plane rotor. As such, the proper axial offset distance 320 may provide for desired aerodynamic performance to be achieved using a smaller rotor diameter. Accordingly, the rotors may be disposed further inward toward the tiltrotor fuselage, possibly resulting in reduced aircraft weight. In one embodiment, aerodynamic performance improvements are maximized using a predetermined axial offset distance 320 corresponding with one to two rotor blade chord lengths. One having ordinary skill in the art will recognize a desirable predetermined axial offset distance 320 that may balance the considerations described herein for a given application.

In an embodiment, yokes 212 of plane 210 and yokes 222 of plane 220 are situated about a common central axis 130 (possibly defined by a mast 132), and plane 210 is parallel to and axially offset a predetermined distance 320 from plane 220. In another embodiment, a 3-inch thick yoke 212 in plane 210 may flap at ±12 degrees of flapping angle 316 in each direction. A minimum predetermined axial offset distance 320 between plane 210 and 220 may be set at 6.25 inches to provide clearance between a yoke 212 and an azimuthally adjacent yoke 222 in plane 220 having similar dimensions and flapping characteristics. However, the predetermined axial offset distance 320 of this embodiment may be larger to take advantage of the aerodynamic performance benefits described in the previous paragraph.

Angular Arrangement of Yoke Planes

Still referring to FIGS. 4A, 4B, and 4C, yokes 200 in a given plane 215 may be angularly offset an angular offset angle 330 from yokes 200 in other plane(s) 215. This may provide for blade flapping clearance, and improved airflow through blades 246 that may be attached to yokes 200 in planes 215.

In one embodiment, as best shown in FIG. 4A, yokes 212 of plane 210 may be angularly offset by an angular offset angle 330 from yokes 222 of plane 220. In another embodiment, yokes 212 of plane 210 substantially bisect the equal angular spacing angles 310 separating yokes 222 in plane 220, and vice versa.

One having ordinary skill in the art will recognize that the number of blade yokes 200, as well as the axial offset distance 320 and the angular offset distance 330 between them, may be determined by a variety of design factors including, but not limited to, performance characteristics; blade flapping and pitching angles; and weight, drag, and load characteristics.

Mechanical Embodiment

Figure 5A:
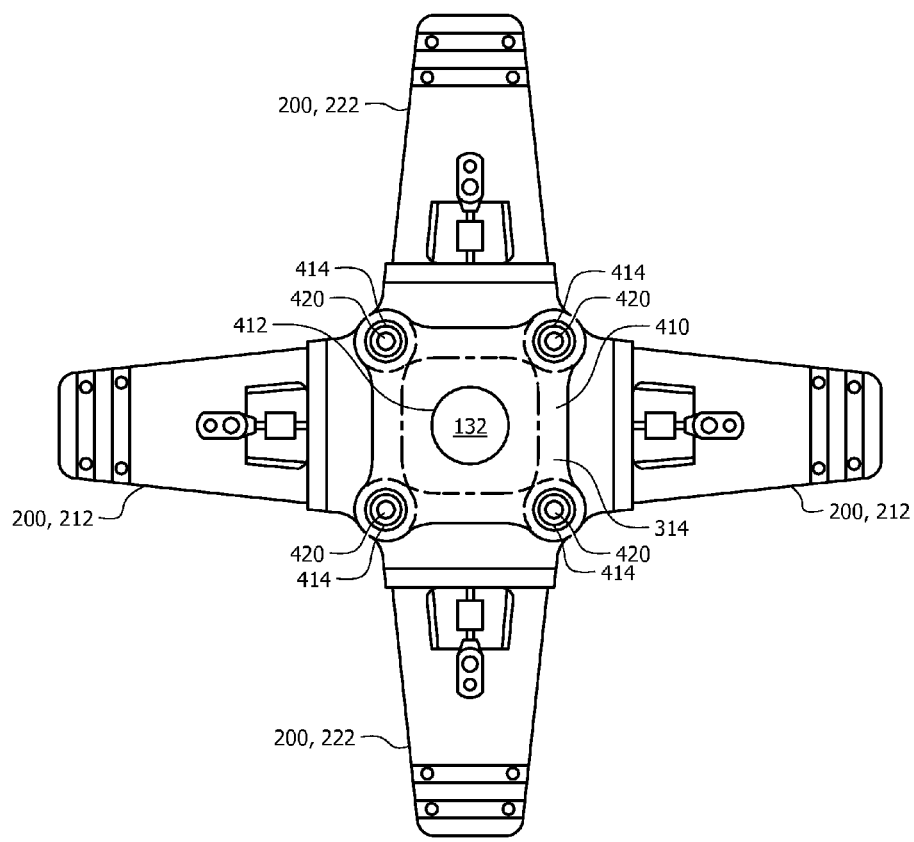
FIG. 5A depicts a top view of mounting hardware used to secure yokes to a mast according to an embodiment of the present disclosure.
Figure 5B:
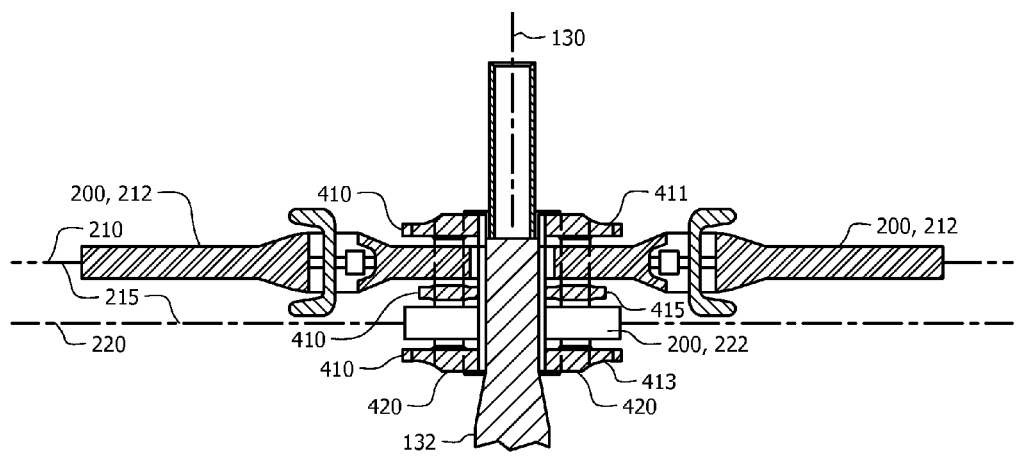
FIG. 5B depicts a side cutaway view of the mounting hardware used to secure yokes to a mast of FIG. 5A according to an embodiment of the present disclosure.

Referring now to FIGS. 5A and 5B, offset stacked yoke hub 100 may include mounting hardware 400, which may comprise mounting plates 410 and axial mounting bolts 420. Hub 100 may comprise any number of mounting plates 410, and mounting plates 410 may be of any suitable material, shape, size, and construction to couple yokes 200 to a mast 132 or similar structure. Mounting plate 410 may comprise a mast cutout 412 forming an aperture of sufficient diameter to allow a mast 132 to pass there through. Each mounting plate 410 may further comprise mounting holes 414 that are sized and arranged to be substantially concentric with the retainer holes 230 disposed through the inner ends 231 of yokes 200 when arranged in a desired configuration about the central axis 130. In such a configuration, mounting bolts 420 may pass through each set of axially-aligned mounting holes 414 and retainer holes 230 to secure yokes 200 to mounting plates 410.

In an embodiment, as best shown in FIG. 5B, hub 100 comprises three mounting plates 411, 413, 415. First mounting plate 411 and second mounting plate 413 may be positioned about the mast 132 on the axially outer sides of planes 210 and 220, respectively. A third mounting plate 415 may be positioned about the mast 132 axially between yokes 212 and yokes 222. In this particular embodiment, each of yokes 212 and 222 comprises two retainer holes 230, and the retainer holes 230 of each yoke 212 in plane 210 substantially axially align with the retainer holes 230 of each azimuthally adjacent yoke 222 in plane 220. Mounting plates 410 are oriented such that mounting holes 414 substantially align with the aforementioned axially aligned retainer holes 230 of yokes 212 and 222. A mounting bolt 420 is disposed through each set of axially aligned mounting holes 414 and retainer holes 230 to secure yokes 212 and 222 to the mounting plates 410, and thereby to mast 132.

Figure 6A:
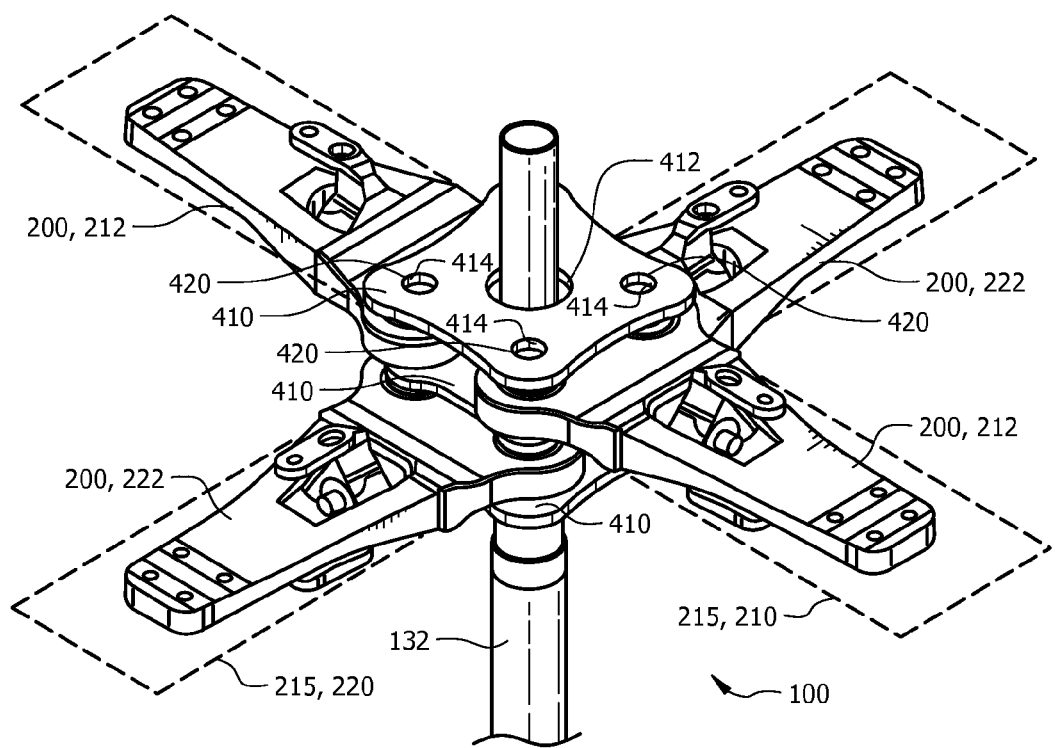
FIG. 6A depicts an assembled perspective view of an offset stacked yoke hub having four yokes according to an embodiment of the present disclosure.
Figure 6B:
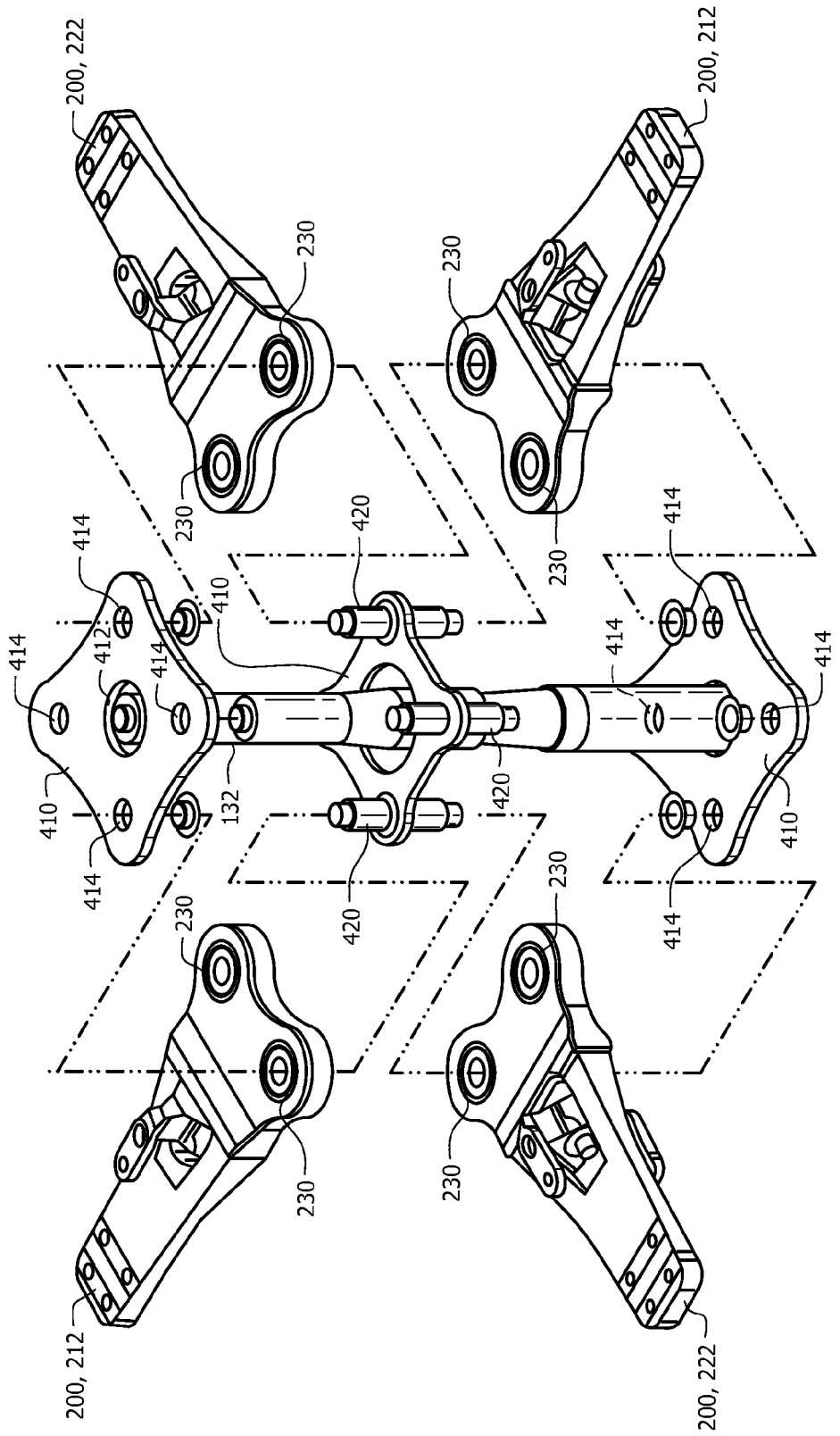
FIG. 6B depicts an exploded perspective view of the offset stacked yoke hub having four yokes of FIG. 6A according to an embodiment of the present disclosure.

Referring now to FIGS. 6A and 6B, an offset stacked yoke hub 100 having four yokes 200 is depicted in assembled and exploded views, respectively. Two mounting bolts 420 secure each yoke 200, and each mounting bolt 420 is shared by two azimuthally adjacent yokes 200. As such, the number of mounting holes 414 in a mounting plate 410 is equal to the number of yokes 200 in hub 100. In this embodiment, the four total yokes 200 may be arranged in two axially offset planes 215, namely two yokes 212 in an upper plane 210, and two yokes 222 in a lower plane 220. Each pair of yokes 212 and 222 has equal angular spacing 310 within their respective planes 210 and 220—that is, yokes 200 in each given plane 215 are spaced 180° apart. The planes 210 and 220 are substantially parallel, share a common central axis 130, and are angularly offset such that yokes 212 in plane 210 bisect the planar spacing angle 310 between yokes 222 in plane 220—that is, each yoke 212 is positioned about 90° from each azimuthally adjacent yoke 222. Yokes 212 and 222 are also "stacked" at an axial offset distance 320.

Each yoke 212 and 222 comprises two retainer holes 230 in its base, and yokes 212 and 222 are set at a radius 312 from the central axis 130 such that a retainer hole 230 on any given yoke 212 aligns axially with a retainer hole 230 on an azimuthally adjacent yoke 222. Mounting holes 414 are arranged to coincide with the axially-aligned retainer holes 230 of the stacked azimuthally adjacent yokes 212 and 222, and mounting bolts 420 may be disposed therein. By stacking yokes 212 and 222 such that their inner ends 231 partially overlap, offset stacked yoke hub 100 may be packaged tighter to a central axis 130 than if all yokes 212 and 222 were arranged in a single plane 215, thereby reducing hub loads, weight, and drag. Axial offset distance 320 between yokes 212 and 222 may accommodate flapping motion of the yoke 200.

Figure 7A:
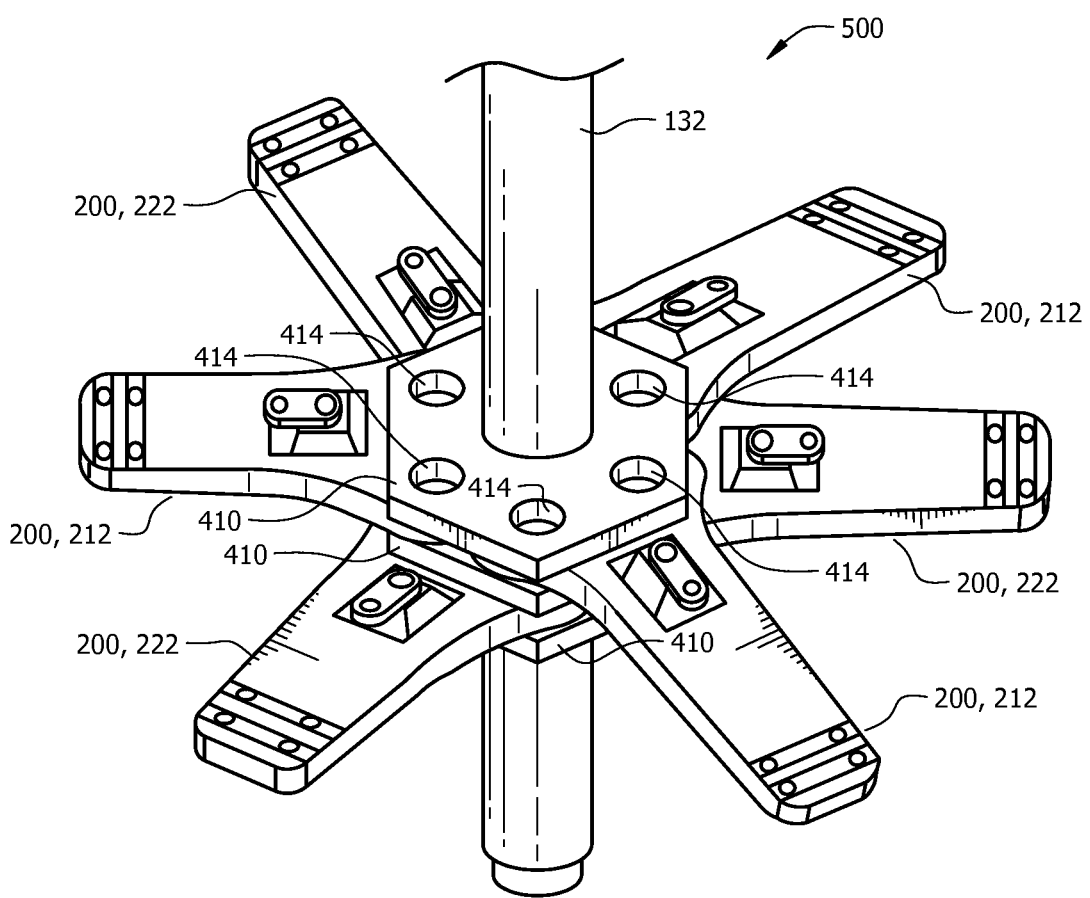
FIG. 7A depicts an assembled perspective view of an offset stacked yoke hub having six yokes according to an embodiment of the present disclosure.
Figure 7B:
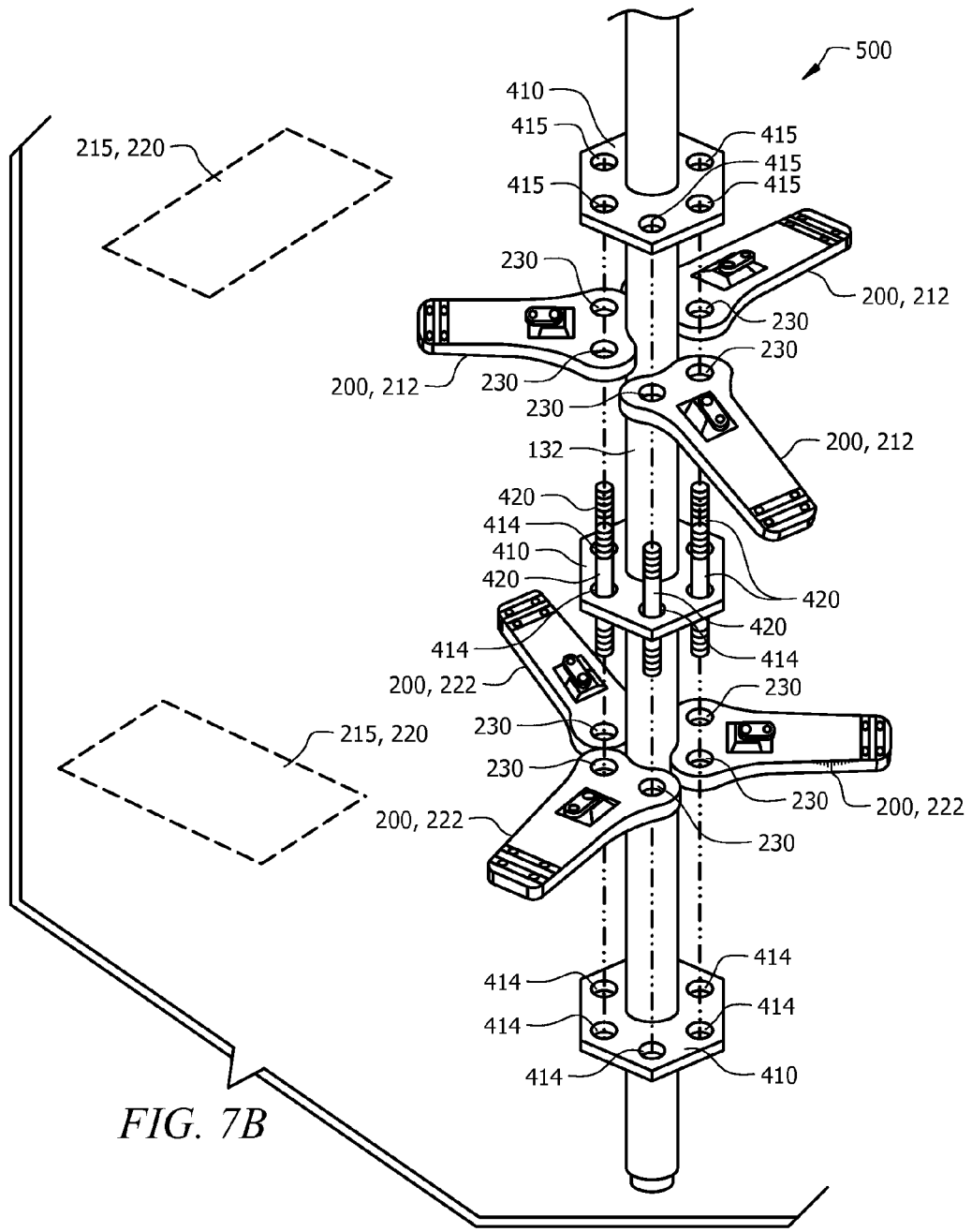
FIG. 7B depicts an exploded perspective view of the offset stacked yoke hub having six yokes of FIG. 7A according to an embodiment of the present disclosure.

Referring now to FIGS. 7A and 7B, an offset stacked yoke hub 500 having six yokes 200 is depicted in assembled and exploded views, respectively. This embodiment comprises mounting plates 410 having six mounting holes 414 arranged in a hexagonal pattern to coincide with axially-aligned retainer holes 230 of yokes 212 and 222 stacked in a manner similar to that described with respect to offset stacked yoke hub 100 having four yokes 200. The six total yokes 200 may be arranged in two axially offset planes 215, namely three yokes 212 in an upper plane 210, and three yokes 222 in a lower plane 220. Each set of yokes 212 and 222 has equal angular spacing 310 within their respective planes 210 and 220—that is, yokes 200 in a given plane 215 are spaced 120° apart. The planes 210 and 220 are substantially parallel, share a common central axis 130, and are angularly offset such that yokes 212 in plane 210 bisect the planar spacing angle 310 between yokes 222 in plane 220—that is, each yoke 212 is positioned about 60° from each azimuthally adjacent yoke 222. Yokes 212 and 222 are also "stacked" at an axial offset distance 320.

Each yoke 212 and 222 comprises two retainer holes 230 in its base, and yokes 212 and 222 are set at a radius 312 from the central axis 130 such that a retainer hole 230 on any given yoke 212 aligns axially with a retainer hole 230 on an azimuthally adjacent yoke 222. Mounting holes 414 are arranged to coincide with the axially-aligned retainer holes 230 of the stacked azimuthally adjacent yokes 212 and 222, and mounting bolts 420 may be disposed therein. Flapping motion may be similarly accommodated by this embodiment.

Figure 8A:
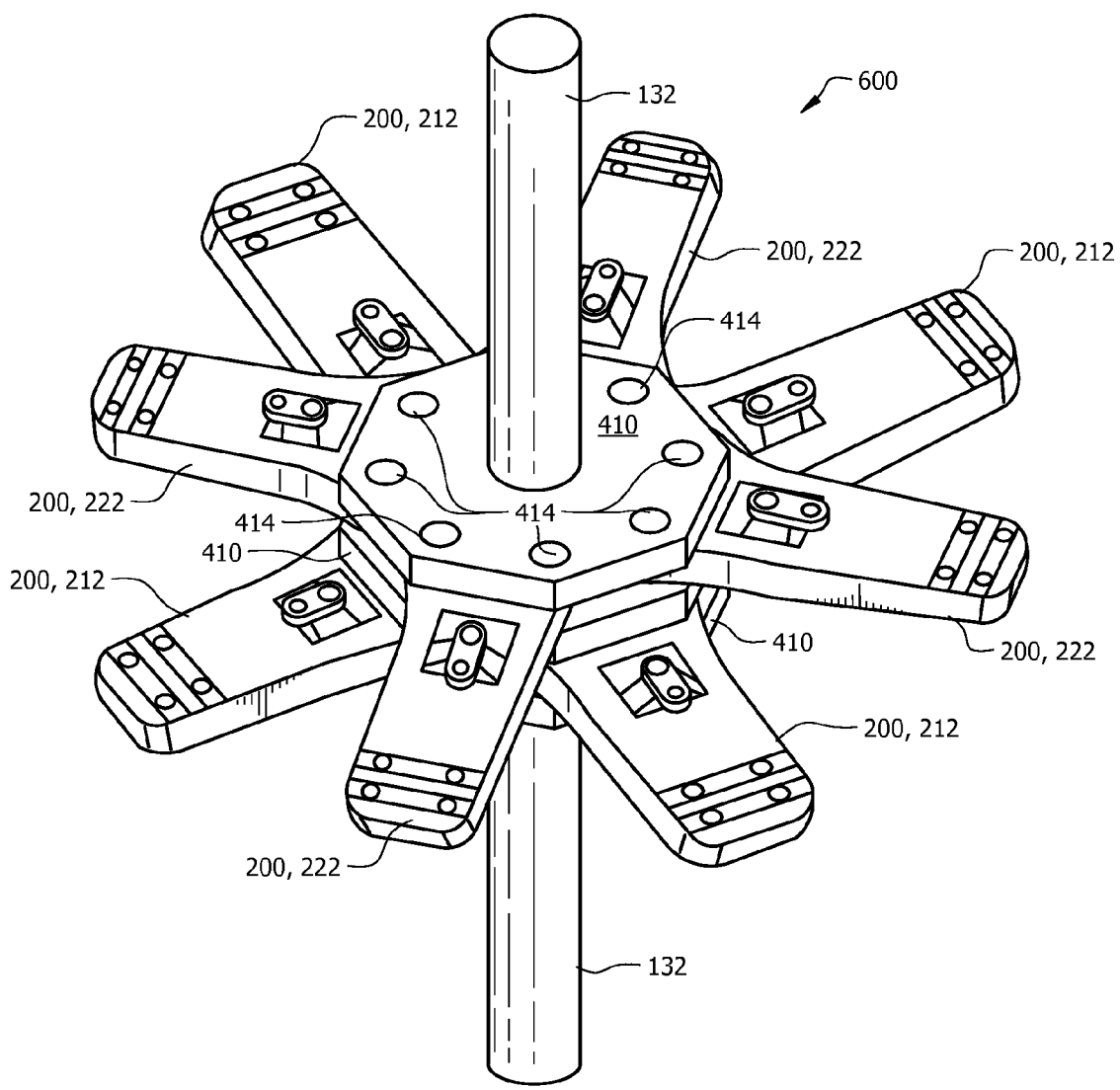
FIG. 8A depicts an assembled perspective view of an offset stacked yoke hub having eight yokes according to an embodiment of the present disclosure.
Figure 8B:
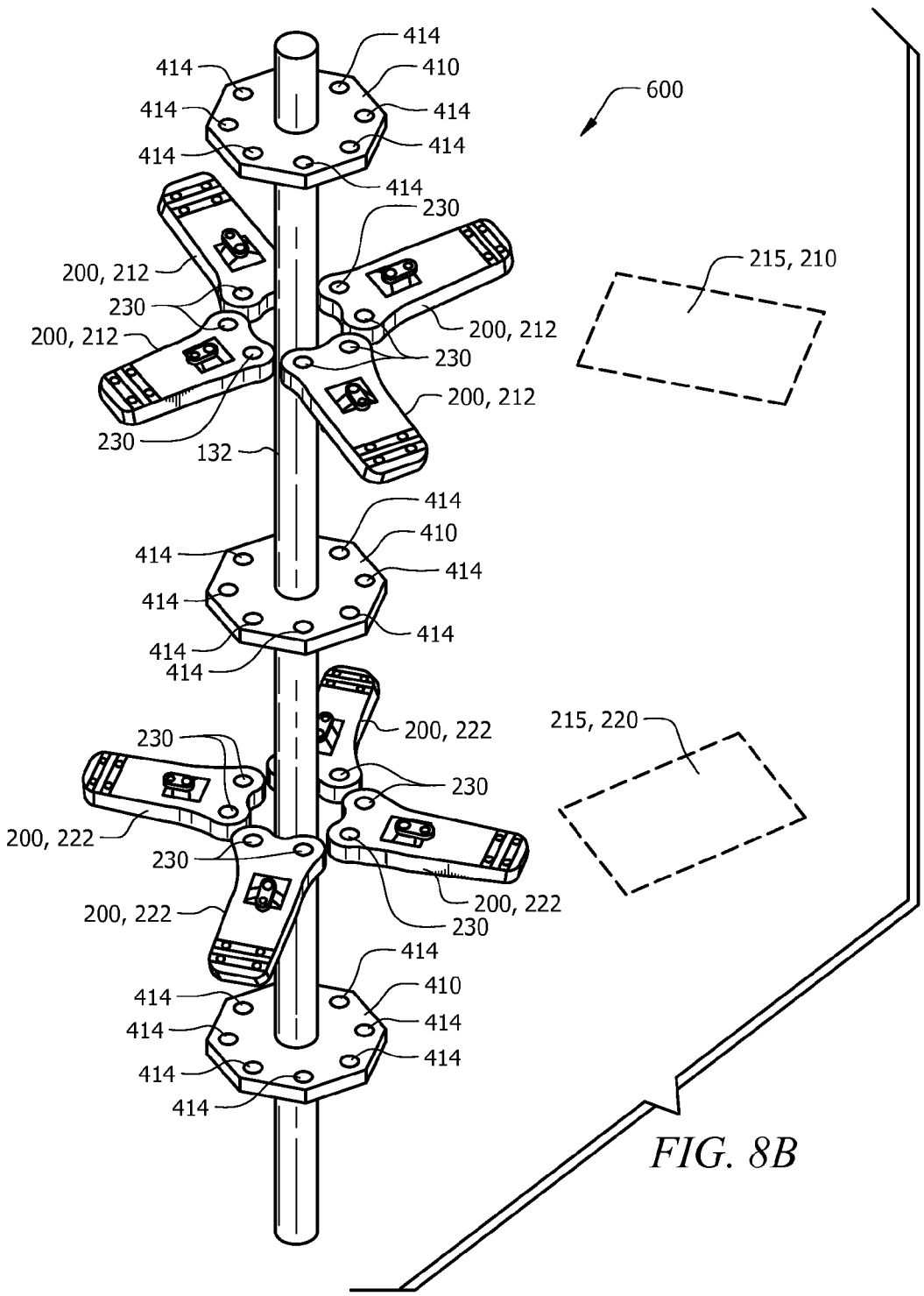
FIG. 8B depicts an exploded perspective view of the offset stacked yoke hub having eight yokes of FIG. 8A according to an embodiment of the present disclosure.

Referring now to FIGS. 8A and 8B, an offset stacked yoke hub 600 having eight yokes 200 is depicted in assembled and exploded views, respectively. This embodiment comprises mounting plates 410 having eight mounting holes 414 arranged in an octagonal pattern to coincide with axially-aligned retainer holes 230 of yokes 212 and 222 stacked in a manner similar to that described with respect to offset stacked yoke hub 100 having four yokes 200 and offset stacked yoke hub 500 having six yokes 200. The eight total yokes 200 may be arranged in two axially offset planes 215, namely four yokes 212 in an upper plane 210, and four yokes 222 in a lower plane 220. Each set of yokes 212 and 222 has equal angular spacing 310 within their respective planes 210 and 220—that is, yokes 200 in a given plane 215 are spaced 90° apart. The planes 210 and 220 are substantially parallel, share a common central axis 130, and are angularly offset such that yokes 212 in plane 210 bisect the planar spacing angle 310 between yokes 222 in plane 220—that is, each yoke 212 is positioned about 45° from each azimuthally adjacent yoke 222. Yokes 212 and 222 are also "stacked" at an axial offset distance 320.

Each yoke 212 and 222 comprises two retainer holes 230 in its base, and yokes 212 and 222 are set at radius 312 from the central axis 130 such that a retainer hole 230 on any given yoke 212 aligns axially with a retainer hole 230 on an azimuthally adjacent yoke 222. Mounting holes 414 are arranged to coincide with the axially-aligned retainer holes 230 of the stacked azimuthally adjacent yokes 212 and 222, and mounting bolts 420 may be disposed therein. Flapping motion may be similarly accommodated by this embodiment.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A rotor hub of a tiltrotor aircraft, comprising:
a first configuration of two or more yokes arranged in a first plane about a mast of the tiltrotor aircraft and having substantially equal angular spacing therebetween;
a second configuration of an equal number of yokes as the first configuration, the equal number of yokes being arranged in a second plane about the mast of the tiltrotor aircraft and having substantially equal angular spacing therebetween;
wherein the second plane is substantially parallel to and axially offset from the first plane; and
wherein a portion of each yoke in the first configuration overlaps with a portion of each azimuthally adjacent yoke in the second configuration; and
a plurality of mounting plates disposed about the rotor hub, wherein each of the plurality of mounting plates includes a plurality of mounting holes,
wherein the number of mounting holes disposed in each of the plurality of mounting plates equals a total quantity of both the configuration yokes and the second configuration yokes.

2. The hub according to claim 1, wherein the second configuration yokes are angularly offset from the first configuration yokes.

3. The hub according to claim 2, wherein the second configuration yokes substantially bisect the angular spaces separating the first configuration yokes, and wherein the angular spaces are equal between each side of each of the second configuration yokes and each side of each of the first configuration yokes.

4. The hub according to claim 1, wherein the second plane is axially offset from the first plane by a predetermined distance sufficient to accommodate flapping without interference.

5. The hub according to claim 1, further comprising a common mounting component coupling each first configuration yoke to at least one azimuthally adjacent second configuration yoke.

6. The hub according to claim 1, wherein the first configuration yokes and the second configuration yokes are arranged at a common radius from the mast.

7. The hub according to claim 1 wherein the first configuration has exactly two yokes and the second configuration has exactly two yokes.

8. The hub according to claim 1 wherein the first configuration has exactly three yokes and the second configuration has exactly three yokes.

9. The hub according to claim 1 wherein the first configuration has four yokes and the second configuration has four yokes.

10. The hub according to claim 1 wherein at least some of the yokes of the first configuration and the second configuration are substantially stiff in-plane.

11. The hub according to claim 1, wherein the second plane is axially offset from the first plane by a predetermined distance substantially equal to about one to two rotor blade chord lengths.

12. The hub according to claim 1, wherein at least some of the yokes of the first configuration and second configuration may undergo flapping motion.

13. A rotor hub of a tiltrotor aircraft, comprising:
a plurality of blade yokes arranged in a first plane about a central axis;
a plurality of blade yokes arranged in a second plane about the central axis;
wherein the second plane is substantially parallel to and axially offset from the first plane;
wherein a portion of each yoke in the first plane overlaps with a portion of each azimuthally adjacent yoke in the second plane; and
wherein the rotor hub is selectively positionable for operation of the tiltrotor aircraft in helicopter mode, airplane mode, and transition modes there between;
a plurality of mounting plates disposed about the rotor hub, wherein each of the plurality of mounting plates includes a plurality of mounting holes; and
a quantity of mounting holes disposed in each of the plurality of mounting plates equal to a total quantity of both the plurality of blade yokes arranged in the first plane and the plurality of blade yokes arranged in the second plane.

14. The hub of claim 13, wherein the plurality of blade yokes in each of the first plane and the second plane are positioned with substantially equal angular spacing therebetween.

15. The hub according to claim 14, wherein the plurality of blade yokes in the first plane are angularly offset from the plurality of blade yokes in the second plane.

16. The hub according to claim 15, wherein the plurality of blade yokes in the second plane substantially bisect the angular spaces separating the plurality of blade yokes in the first plane.

17. The hub according to claim 13, further comprising a common mounting component coupling each yoke in the first plane to the overlapping azimuthally adjacent yoke in the second plane.

18. A rotor hub of a tiltrotor aircraft, comprising:
a plurality of blade yokes configured in a stacked arrangement such that a portion of each yoke in a first axial plane overlaps with a portion of each azimuthally adjacent yoke in a second axial plane;
a plurality of mounting components including a plurality of mounting plates and a plurality of mounting holes, each mounting component coupling each yoke in the first axial plane to the overlapping azimuthally adjacent yoke in the second axial plane;
wherein the rotor hub is coupled to a mast of the tiltrotor aircraft; and
a quantity of mounting holes disposed in each mounting plate equal to a total quantity of the plurality of blade yokes in both the first axial plane and the second axial plane.

19. The hub of claim 18, wherein the plurality of blade yokes in each of the first plane and the second plane are positioned with substantially equal angular spacing therebetween.

20. The hub according to claim 19, wherein the plurality of blade yokes in the second plane substantially bisect the angular spaces separating the plurality of blade yokes in the first plane.

* * * * *